United States Patent [19]
Engleman et al.

[11] Patent Number: 4,862,058
[45] Date of Patent: Aug. 29, 1989

[54] VOLTAGE REGULATOR

[76] Inventors: Ivan M. Engleman, 85 Everett Dr., Security, Colo. 80911; Thomas G. Kozisek, 4445 Enchanted Cir. N., Colorado Springs, Colo. 80917

[21] Appl. No.: 185,968

[22] Filed: Apr. 25, 1988

[51] Int. Cl.⁴ ............................ G05F 1/63; H02P 9/10
[52] U.S. Cl. .................................... 323/298; 323/364; 323/901; 322/8; 322/60; 320/62; 361/18; 361/20
[58] Field of Search .................. 322/7, 8, 60; 320/62; 323/293, 297, 298, 901, 364, 371; 361/18, 20, 23, 29, 30, 31, 33, 41

[56] References Cited

U.S. PATENT DOCUMENTS

| | | | |
|---|---|---|---|
| 2,560,630 | 7/1951 | Brown . | |
| 2,674,717 | 4/1954 | Ponsy | 323/297 |
| 2,807,770 | 9/1957 | Lichtenfels . | |
| 3,950,675 | 4/1976 | Weber et al. . | |
| 4,300,089 | 11/1981 | Kawabe et al. | 322/8 |
| 4,775,828 | 10/1988 | Watley et al. | 322/7 |

*Primary Examiner*—Patrick R. Salce
*Assistant Examiner*—Emanuel Todd Voeltz
*Attorney, Agent, or Firm*—Henderson & Sturm

[57] ABSTRACT

A voltage regulator that reduces the voltage output of a generator to make it appropriate for use with an external load. The voltage regulator includes a starting unit for use with on-demand generators to cause the on-demand generator to start without presenting a risk to the external load.

9 Claims, 2 Drawing Sheets

VOLTAGE REGULATOR

TECHNICAL FIELD

This invention relates generally to voltage control devices.

BACKGROUND ART

Portable generators are well known in the art. Such devices are used to provide a source of electric power at locations were such power may not ordinarily be available, such as at construction sites and the like. Unfortunately, many generators produce a relatively high output voltage, such as 150 volts. High voltages such as this can potentially harm the tools and other equipment that are intended for use with the generator.

To resolve this problem, voltage regulators have been used to reduce the output voltage from the generator to a safe, useful level. Many of these voltage regulators, however, are relatively expensive and sometimes confusing to the operator.

Also, such devices are not necessarily easily used with on-demand generators that provide a power output only when a load is sensed. In the latter case, connecting a load directly to the generator to cause the generator to start risks all of the problems indicated earlier. Connecting the load to the generator through a voltage regulator, however, may not effectively result in the starting of the generator, and may still pose risk to the load itself.

A need therefore exists for a voltage regulator device that can effectively limit the voltage output of a generator, and that can be effectively used with an on-demand generator. Such a device should be relatively simple to manufacture and use, and should be effective in use.

SUMMARY OF THE INVENTION

These needs and others are substantially met through provision of the voltage regulator device disclosed in this specification. This device includes generally an input for connecting to an output of a generator, a voltage divider for dividing down the voltage provided at the input, and an output for providing the controlled voltage to an external load. The device can also include a meter for providing a visual indication of the controlled voltage level, and a pilot lamp for indicating the presence of the controlled voltage level.

In one embodiment, the device may also include a starting unit for presenting an internal load to an on-demand generator connected to the input. This internal load causes the on-demand generator to start without presenting risk to the desired external load.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein.

BEST MODE FOR CARRYING OUT THE INVENTION

Figure 1:
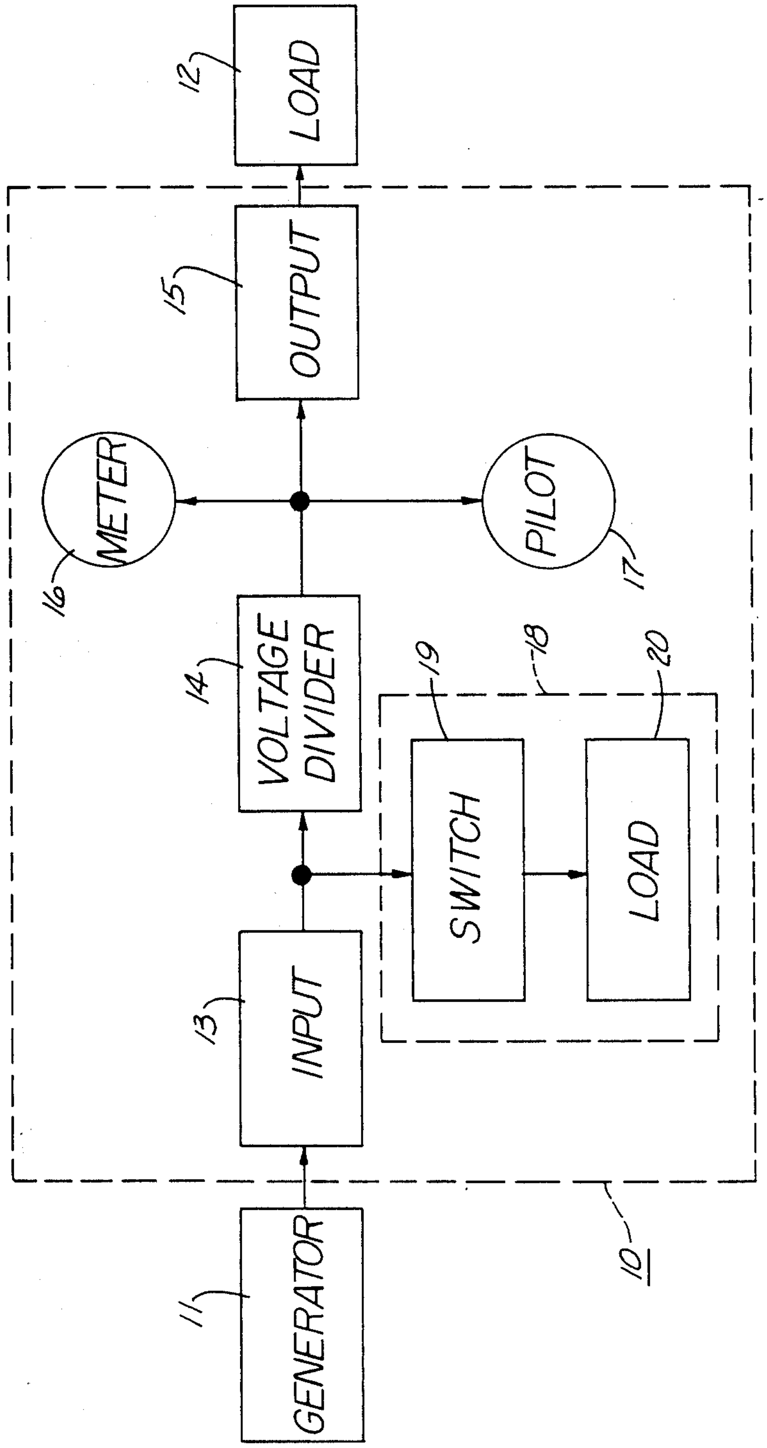
FIG. 1 comprises a block diagram depiction of the device.

Referring now to the drawings, and in particular to FIG. 1, the device can be seen as generally depicted by the numeral 10. The device (10) operates in conjuction with a generator (11) and an external load (12). The generator (11) in this example comprises an on-demand generator that nominally provides 150 volts at its output, and the external load (12) comprises a device that requires a supply voltage of between 90 and 120 volts.

The device (10) itself generally includes an input (13), a voltage divider (14), an output (15), a meter (16), a pilot lamp (17), and a starting unit (18). The starting unit (18) generally includes a switch (19) and an internal load (20). Each of the above generally referred to component elements will now be described in more detail in seriatim fashion.

Figure 2:
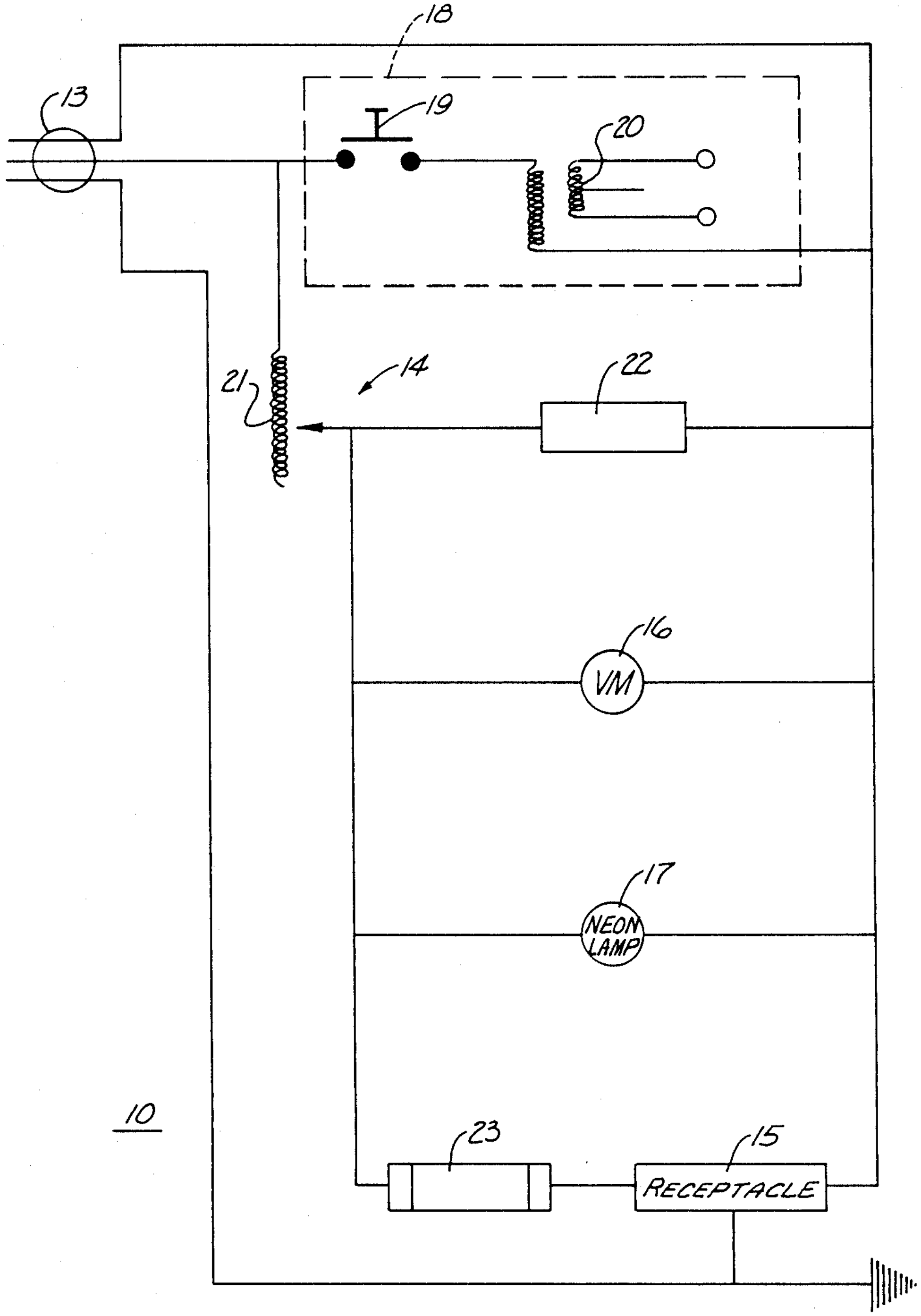
FIG. 2 comprises a schematic diagram of the device.

Referring now to FIG. 2, the input (13) can be provided through use of a male amphenal plug. This plug can be used to couple the device (10) to the output of the generator (11).

The output (15) can be comprised of a standard female receptacle of a type suitable for mating with the input device of the external load (12). For purposes of safety, a ground post can be provided as appropriate to a given application.

The voltage divider (14) can be comprised of a first and second resistor (21 and 22). The first resistor (21) comprises a rheostat mounted in conjunction with a heat sink, and connects at one terminal to the hot lead of the input (13). The variable lead of the first resistor (21) connects to one terminal of the second resistor (22), which has its remaining lead connected to the neutral lead of the input (13). In this embodiment, the second resistor (22) comprises a 1.2K ohm resistor.

The meter (16) connects in parallel across the output of the voltage divider (14) and comprises a 0 to 150 AC voltmeter. Through use of this meter (16), the output voltage for the device (10) can be reduced to a desired level. The meter (16) can also be used to monitor the output voltage to ensure that the output voltage remains within the desired range.

The pilot lamp (17) also connects in parallel across the output of the voltage divider (14) and may be comprised of a neon light. The pilot lamp indicates the presence of a controlled voltage output at the output of the voltage divider (14).

The starter (18) includes a switch (19) that may be comprised of a push button normally open two pole switch. One pole of the switch (19) connects to the hot lead of the input (13), and the remaining pole connects to one side of the primary of a 120 volt to 12 volt AC transformer (20). The remaining side of the primary connects to the neutral lead of the input (13). The secondary of the transformer (20) remains unconnected.

Finally, a fuse (23), such as a 15 ampere fused element, can be connected in series with the output (15).

Operation of the device (10) will now be set forth.

An on-demand generator (11) can be coupled to the input (13). The push button switch (19) can then be closed to present a light load to the generator (11). The presence of this load will cause the generator (11) to start. While maintaining the switch (19) in a closed position, the rheostat (21) in the voltage divider (14) can be manipulated to present at least a light load to the input (13). The switch (19) can then be released and allowed to open. The voltage divider (14) and the pilot (17) will present a sufficient load to the generator (11) to maintain its operational status.

The rheostat (21) can then be further manipulated to obtain the desired controlled voltage output as indicated on the meter (16). The external load (12) can then be connected to the output (15) and operated as desired.

If the external load (12) should draw too much current and cause the fuse (23) to open circuit, power through the output (15) will of course terminate. The pilot lamp (17), however, will continue to indicate the presence of the controlled voltage output. This allows the user to quickly identify the fuse (23) as the cause of the cessation of power.

Through provision of this device (10), an electrically powered device can be used in conjunction with a generator that provides an output voltage higher than the voltage rating of the electrically powered device. The device (10) has particular value in use with an on-demand generator.

We claim:

1. A voltage regulator for use with an on-demand generator having a voltage output, said voltage regulator comprising:

(A) input means for coupling to said voltage output of said on-demand generator;

(B) voltage divider means coupled to said input means for dividing a voltage appearing at said voltage output to produce a controlled voltage output;

(C) output means coupled to said voltage divider means for providing said controlled voltage output to an external load;

(D) load means for presenting a predetermined load to the on-demand generator;

(E) switch means coupled between said input means and said load means, for selectively connecting said load means to said input means to cause said on-demand generator to begin operating by presenting said predetermined load to said voltage output of said on-demand generator.

2. The voltage regulator of claim 1 wherein said load means comprises a transformer.

3. The voltage regulator of claim 2 wherein said transformer comprises a 120 volt to 12 volt transformer.

4. The voltage regulator of claim 3 wherein said transformer has primary terminals that are coupled to said switch means.

5. The voltage regulator of claim 1 wherein said switch means comprises a normally open switch.

6. The voltage regulator of claim 1 and further including a voltmeter coupled in parallel with said output means, such that said voltmeter provides a display of said controlled voltage output.

7. The voltage regulator of claim 1 and further including a pilot lamp coupled in parallel with said voltage divider means to provide an indication of when a controlled voltage output is being provided by said voltage divider means.

8. The voltage regulator of claim 7 wherein a fuse is coupled in series with said output means to protect said predetermined load.

9. The voltage regulator of claim 8 wherein said pilot lamp will provide said indication, even when said fuse presents an open circuit, as long as said voltage divider means presents said controlled voltage output.

* * * * *